United States Patent
Gehrke et al.

(10) Patent No.: US 10,941,842 B2
(45) Date of Patent: Mar. 9, 2021

(54) RESETTABLE ELECTRO-MECHANICAL CAM ACTUATED SHAFT DISCONNECT FOR GENERATORS

(71) Applicant: HONEYWELL INTERNATIONAL INC., Morris Plains, NJ (US)

(72) Inventors: Jens Gehrke, Rancho Palos Verdes, CA (US); Cesar Abraham Davila, Mexicali (MX); Arturo Maceda, Mexicali (MX); Tom Phielix, Tucson, AZ (US); Balwinder Singh Birdi, Tucson, AZ (US)

(73) Assignee: Honeywell International Inc., Charlotte, NC (US)

( * ) Notice: Subject to any disclaimer, the term of this patent is extended or adjusted under 35 U.S.C. 154(b) by 241 days.

(21) Appl. No.: 15/960,073

(22) Filed: Apr. 23, 2018

(65) Prior Publication Data
US 2019/0323583 A1 Oct. 24, 2019

(51) Int. Cl.
*F16H 25/14* (2006.01)
*F16D 15/00* (2006.01)

(52) U.S. Cl.
CPC ............ *F16H 25/14* (2013.01); *F16D 15/00* (2013.01)

(58) Field of Classification Search
CPC .... F16D 11/04; F16D 11/14; F16D 2023/123; F16D 27/102; F16D 43/208; F16D 43/206; F16D 43/204; F16D 15/00; H02K 7/003; F16H 25/14; Y10T 477/70
See application file for complete search history.

(56) References Cited

U.S. PATENT DOCUMENTS

| | | | |
|---|---|---|---|
| 3,979,925 A * | 9/1976 | Kato | F16D 7/10 464/35 |
| 4,244,455 A * | 1/1981 | Loker | F16D 23/12 192/24 |
| 4,434,881 A | 3/1984 | Denk et al. | |
| 4,579,205 A * | 4/1986 | Post | F16D 1/108 192/103 R |
| 4,997,072 A | 3/1991 | Lapthorne | |
| 5,085,306 A * | 2/1992 | Beigang | F16D 27/118 192/71 |
| 5,616,080 A * | 4/1997 | Miescher | F16D 43/208 192/56.1 |
| 6,619,454 B2 | 9/2003 | Hayward | |
| 8,074,777 B2 | 12/2011 | Birdi et al. | |
| 9,685,841 B2 | 6/2017 | Davis et al. | |
| 2014/0270616 A1* | 9/2014 | Umemoto | F16C 27/066 384/569 |
| 2016/0134171 A1* | 5/2016 | Davis | H02K 7/003 310/78 |

(Continued)

FOREIGN PATENT DOCUMENTS

EP 0303121 A1 * 2/1989 ........... F16D 43/208

*Primary Examiner* — Daniel D Yabut
(74) *Attorney, Agent, or Firm* — Fogg & Powers LLC (57) ABSTRACT

A disconnect assembly for an input shaft and an output shaft includes a sleeve configured to be disposed about the input shaft and the output shaft. A cam is disposed about the sleeve. A cam follower is configured to contact the cam. An interfacing element is configured to operatively interface the sleeve, the input shaft, and the output shaft. The sleeve, the cam, the cam follower, and the interfacing element are configured to move between a respective connect position and a respective disconnect position.

20 Claims, 9 Drawing Sheets

(56) References Cited

U.S. PATENT DOCUMENTS

| | | | |
|---|---|---|---|
| 2017/0248172 A1* | 8/2017 | Weidemann | F16D 11/14 |
| 2018/0112723 A1* | 4/2018 | Pando Rodriguez | F16D 15/00 |
| 2018/0231070 A1* | 8/2018 | Hehenberger | F16D 23/14 |
| 2019/0249721 A1* | 8/2019 | Nakayama | F16D 11/04 |

* cited by examiner

FIG. 5A - CONNECT POSITION

FIG. 5B - CONNECT POSITION

FIG. 5C

FIG. 5D - DISCONNECT POSITION

FIG. 5E - DISCONNECT POSITION

FIG. 5F - DISCONNECT POSITION

RESETTABLE ELECTRO-MECHANICAL CAM ACTUATED SHAFT DISCONNECT FOR GENERATORS

BACKGROUND OF THE INVENTION

The present invention generally relates to generators and, more particularly, to apparatus and methods for disconnecting the drive shaft to a generator.

An aircraft generates electrical power via generators mounted to engine accessory gearboxes. The generator drive shaft typically incorporates a shear section to protect the gearbox from over-torque in the unlikely event of a catastrophic generator failure. The shear section removes mechanical drive from a failed generator thus eliminating any vibration and damage to the gearbox.

Integrated drive generators (IDG) have traditionally included a pilot operable shaft disconnect to minimize IDG damage (and subsequent repair cost) if it shows signs of impending failure (i.e., high oil temperature or vibration). IDGs are being eliminated as the industry moves towards variable speed, variable frequency, or DC generators. (Shear section cannot be reliably designed for the variable speed/frequency generators.)

A significant issue with variable speed generators is that the shaft shear section needs to be sized for minimum speed, maximum load operation. When they are running at higher speeds, the required drive torque is much reduced. So at high speed, the rotating energy to operate the shear section can be very high. In a failure mode, this could lead to high vibration and consequential damage to the gearbox prior to the shear section disconnecting mechanical drive.

As can be seen, there is a need for improved apparatus and methods for an externally operable disconnect between input and output shafts, and that is resettable so it can be periodically tested and then reset.

SUMMARY OF THE INVENTION

In one aspect of the present invention, a disconnect system for an input shaft and an output shaft comprises a sleeve configured to be disposed about the input shaft and the output shaft; a cam disposed about the sleeve; a cam follower configured to contact the cam; and an interfacing element configured to operatively interface the sleeve, the input shaft, and the output shaft; wherein the sleeve, the cam, the cam follower, and the interfacing element are configured to move between a respective connect position and a respective disconnect position.

In another aspect of the present invention, a disconnect system for an input shaft and an output shaft comprises a sleeve configured to operatively interface the input shaft and the output shaft; a cam configured to rotate and translate in relation to movement of the sleeve; and an interfacing element configured to operatively interface the sleeve, the input shaft, and the output shaft; wherein, when the sleeve moves, the cam and the interfacing element move between a respective connect position and a respective disconnect position.

In a further aspect of the present invention, a disconnect system for an input shaft and an output shaft comprises a sleeve configured to move in an axial direction along a longitudinal axis; an undulating surface element on the sleeve and configured to rotate about and move axially along the longitudinal axis; a surface follower that interfaces the undulating surface element and is configured to move radially away from and towards the longitudinal axis; an interfacing element that interfaces the sleeve, the input shaft, and the output shaft, and the interfacing element is configured to move radially away from and towards the longitudinal axis; wherein, when the surface follower moves, the sleeve, the undulating surface element and the interfacing element move between a respective connect position and a respective disconnect position.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides apparatus and methods to electromechanically actuate and reset a shaft disconnect, such as for generators. The inventive apparatus may fit between the gearbox and the generator enabling decoupling of drive from the gearbox. It uses a cam actuated ball spline connection to increase reliability and reduce size, weight and cost. The invention eliminates the need for magnets to hold the disconnected position, and has replaceable inserts to control a path of the ball allowing the design to increase hardness, and improve maintenance.

Generally, in embodiments of the present invention, the outer support of the balls is a solenoid actuated cam that has pockets to capture the power transmitting balls. When the solenoid is energized, a cam follower is released to move into contact with the cam. The cam profile is designed for high speed applications. The cam can move an outer sleeve "left", which causes the sleeve ball recesses to align with the balls center of gravity, allowing the balls to spin away into these cavities. The existing centrifugal loads on the rotating balls prevent the reentry of the balls into the generator shaft pockets.

Also, and in general, pockets installed at the base of the recess hold the balls in place as an outer sleeve support moves completely to its "left" and the generator shaft slows to a stop. The recesses are designed to minimize impact stresses and enable resetting of the disconnect. To reset, realign a stub shaft with the generator shaft, reset the cam follower, and move the outer sleeve to the "right". Additionally, a spring reset can be configured to push the sleeve back to the "left" to reengage the slots once the cam follower has been reset and the shaft has been manually realigned.

One of the advantages of the ball in a slot drive mechanism is the ability to remove the balls from the load path quickly using the geometry of the ball in contact with the radiused groove to drive the ball out of the recess for a given torque input. The size and number of balls required is dictated by the torque to be transferred. Another advantage of this mechanism is that the force needed to move an armature (disengage) under load will be minimized due to the rolling contact with the balls. Rolling resistance is much more predictable and less damaging than sliding contact ensuring more consistent performance and multi-actuation capability. The invention is capable of transmitting torque in either direction. It can be used to disconnect a starter generator configuration.

Figure 1:
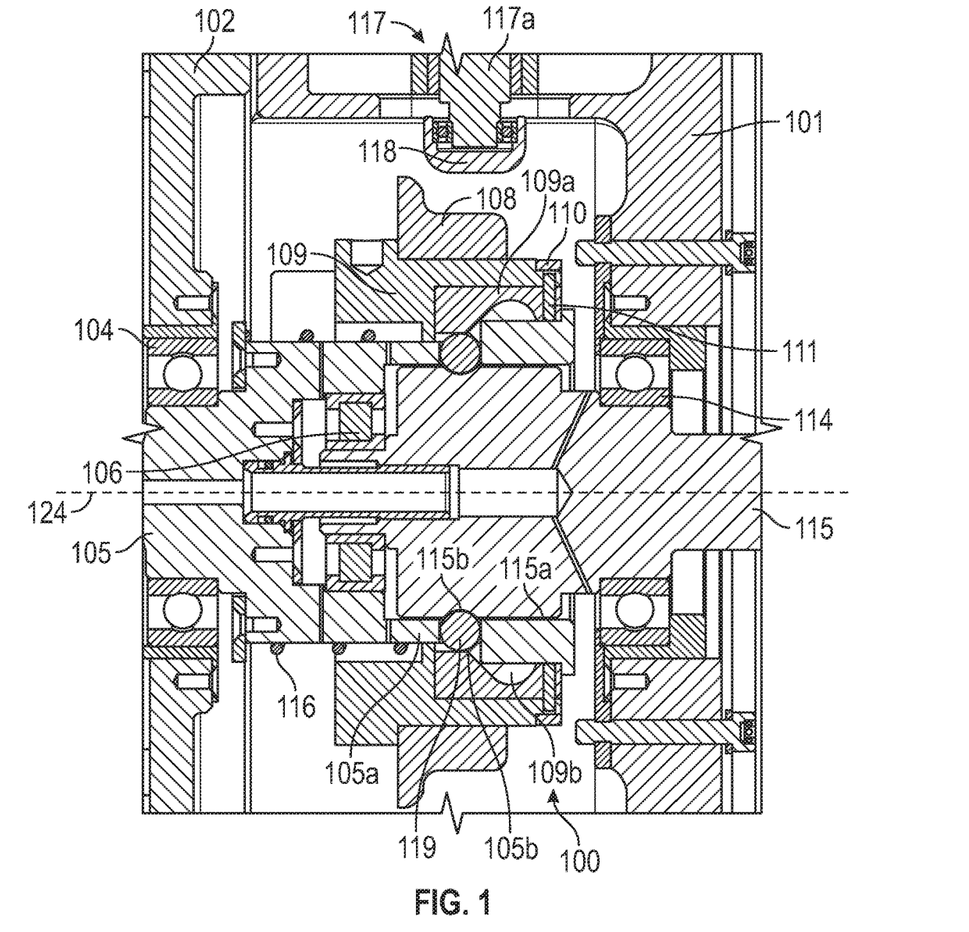
FIG. 1 is a cross-sectional view of a disconnect assembly according to an embodiment of the present invention.

FIG. 1 is an exemplary embodiment of a disconnect assembly 100 that may connect and disconnect an output or driving shaft 105 and an input or driven shaft 115. For example, the output shaft 105 is a generator shaft while 115 is a gearbox shaft. As a further example, the input shaft 115 may be disposed within the output shaft 105, and may both lie along and about a longitudinal axis 124. In some examples, the input shaft 115 may be rotatably supported in a ball bearing 114, while the output shaft 105 may be rotatably supported in a ball bearing 104.

In various instances, the input shaft 115 may have an exterior surface 115a that can be configured with one or more surface receiving elements 115b that can receive one or more interfacing elements 119 described below. In some instances, the receiving element(s) 115b is a depression in the exterior surface 115a.

Similarly, in various instances, the output shaft 105 may have an exterior wall 105a that can be configured with one or more wall receiving elements 105b that can receive one or more interfacing elements 119 described below. In some instances, the wall receiving element(s) 105b is an opening(s) through the wall 105a.

In embodiments, the disconnect assembly 100 may enclose the assembly components within a housing 101 and a housing cover 102. A sleeve 109 may be configured to operatively interface and be disposed about the input shaft 115 and the output shaft 105. More specifically, the sleeve 109 may be affixed to the input shaft 115. Thus, the sleeve 109 may rotate, with the input shaft 115, about the longitudinal axis 124. As further described below, the sleeve 109 may be further configured to move in, and translate back and forth along, an axial direction of the longitudinal axis 124.

The sleeve 109 may, in embodiments, have a sleeve insert 109a. In such embodiments, a retention ring 110 and a pin 111 may retain the sleeve insert 109a in the sleeve 109. Within the sleeve insert 109, one or more sleeve receiving elements 109b can be configured therein. As an example, the receiving element(s) 109b may be configured as a channel.

In other examples, when configured as a channel, the receiving element 109b may be angled or sloped in relation to the longitudinal axis 124. Further, the sleeve receiving element 109b may be configured to receive and hold one or more interfacing elements 119 described below.

The disconnect assembly 100 may have an undulating surface element 108 that may be disposed about and affixed to the sleeve 109. From a cross-sectional view of the undulating surface element 108, as shown in the exemplary embodiment of FIG. 1, the outer surface configuration can be sloping, uneven in width, and/or uneven in height. Because of the operative connection to the sleeve 109, the undulating surface element 108 may rotate about, and translate along, the axial direction of the longitudinal axis 124 in relation to, or in conjunction with, movement of the sleeve 109.

Figure 2:
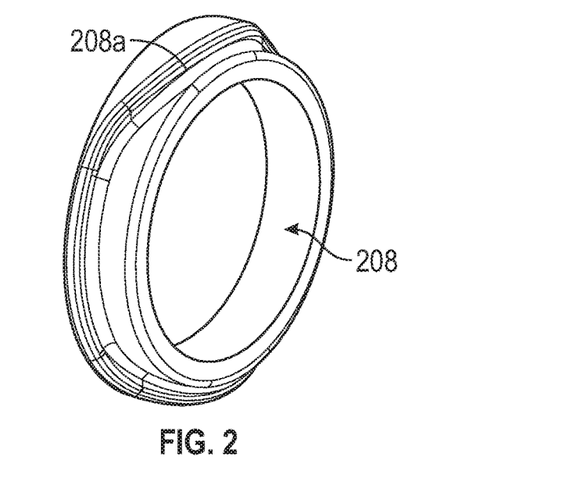
FIG. 2 is a perspective view of a cam in a disconnect assembly according to an embodiment of the present invention.

In FIG. 2, according to embodiments, the undulating surface element 208 may be a cam. The cam may be ring-shaped and have an exterior, circumferential surface 208a. In a longitudinal or axial direction, the exterior surface 208 may have a smooth changing width.

Referring back to FIG. 1, the disconnect assembly 100 may have a surface follower 118 that interfaces the undulating surface element 108. The surface follower 118 may be configured to move radially away from and towards the longitudinal axis 124. Thereby, the surface follower 118 may move into and out of contact with the undulating surface element 108.

According to embodiments, the surface follower 118 is a cam follower. In such embodiments, the undulating surface element is a cam.

The disconnect assembly 100 may further include an actuator subassembly 117 to actuate radial movement of the cam follower 118. In embodiments, the actuator subassembly 117 may include a plunger 117a that can be manually and/or automatically moved radially, either away from or towards the longitudinal axis 124. In turn, the cam follower 118 is moved radially, either away from or towards the longitudinal axis 124.

In embodiments, the disconnect assembly 100 may include a reset spring 116. The spring 116 may become loaded as the sleeve 109 moves laterally towards the spring 116, as further described below. The spring 116 may be released to move the sleeve 109 laterally away from the spring 116, as further described below.

FIGS. 3A-3D depict an exemplary disconnect assembly 300 and may be similar to that described in relation to FIG. 1. Accordingly, reference numbers in FIGS. 3A-3D correspond to like reference numbers in FIG. 1.

Figure 3A:
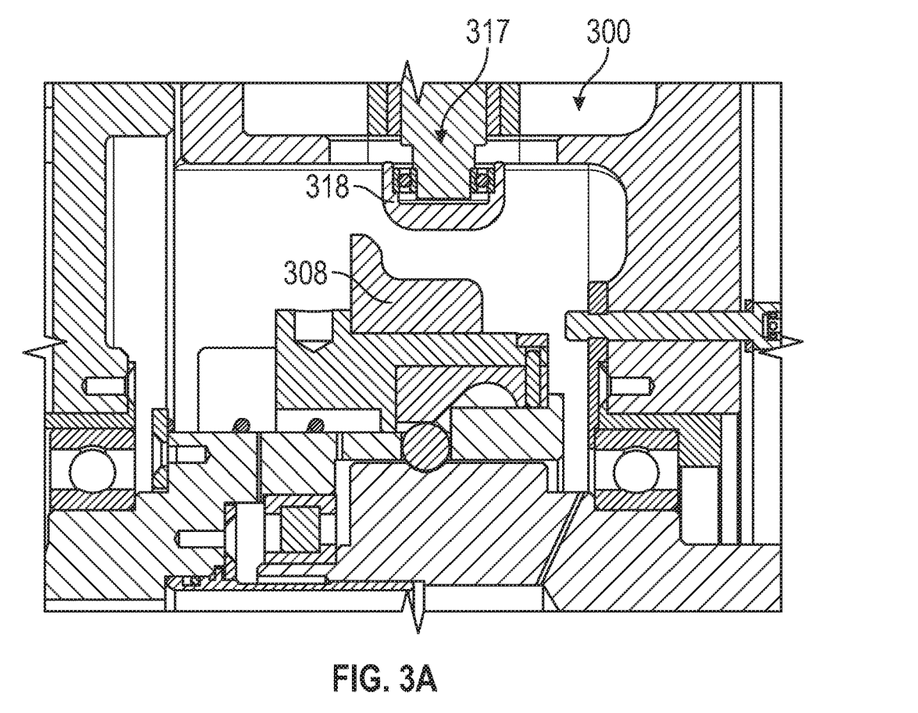
FIGS. 3A-3D are cross sectional views of relative movement between a cam and a cam follower in a disconnect assembly according to an embodiment of the present invention.
Figure 3B:
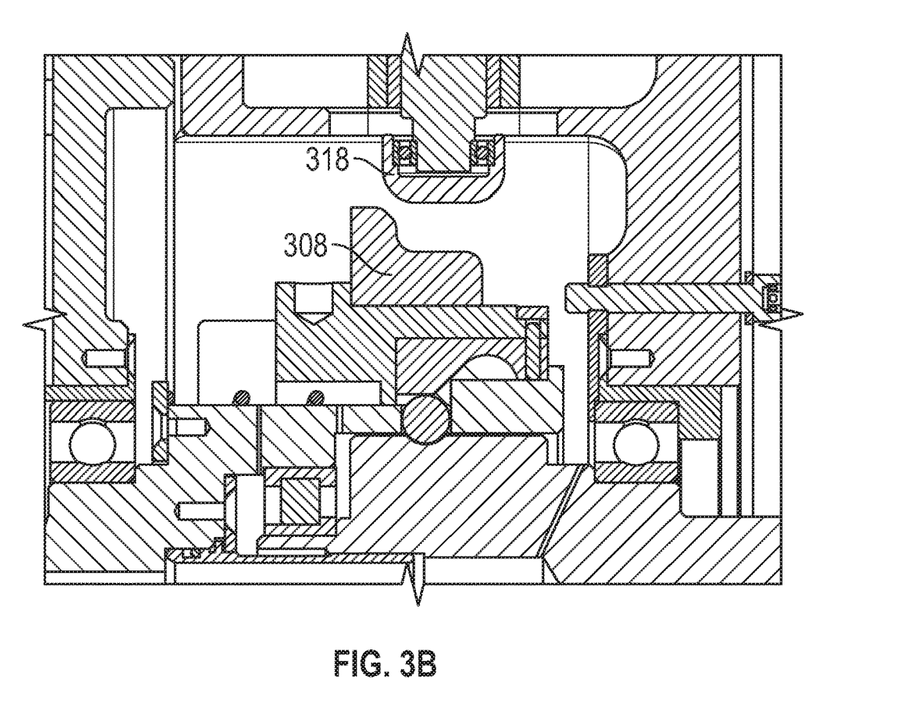

In FIG. 3A, an actuator subassembly 317 may be positioned to initiate or activate movement of a cam follower 318. In FIG. 3B, the cam follower 318 has moved radially towards the cam 308. Also in FIG. 3B, the cross section of the cam 308 has changed since the cam 308 has rotated since that depicted in FIG. 3A.

Figure 3C:
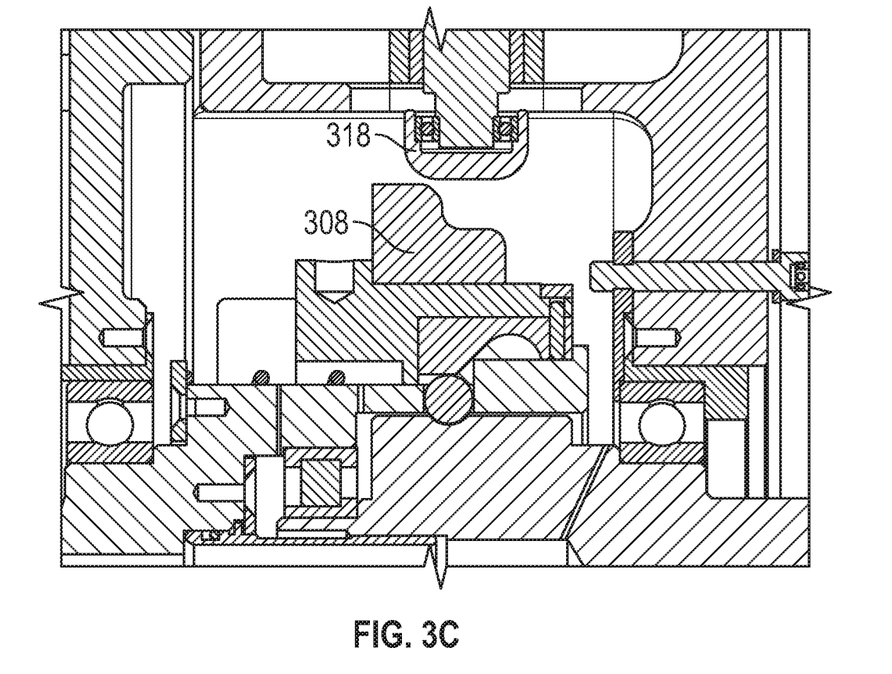
Figure 3D:
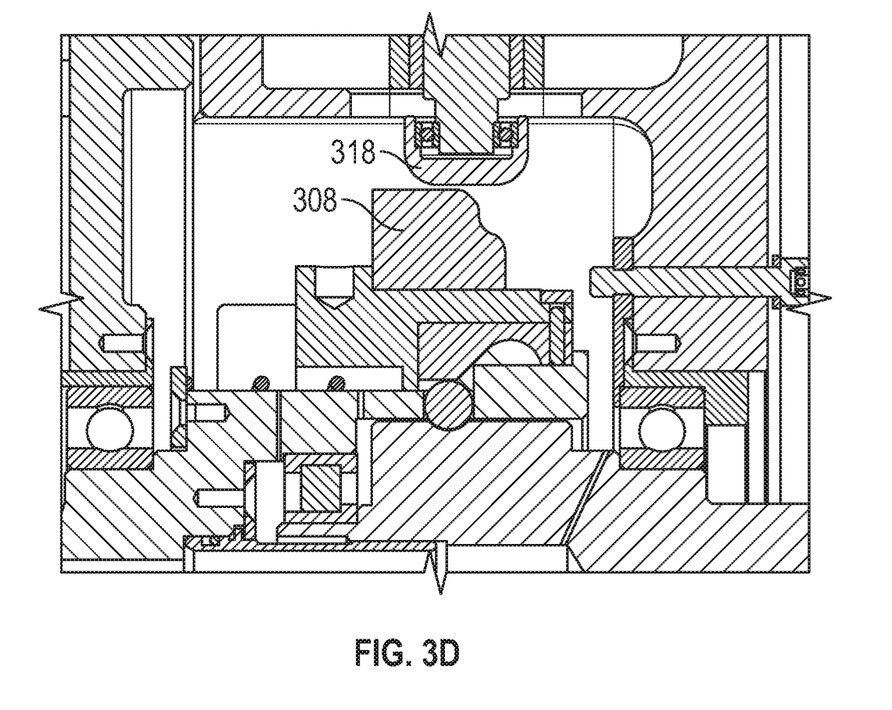

In FIG. 3C, the cam 308 has further rotated since that depicted in FIG. 3B and, thus, the cross section of the cam 308 has changed. At this time, and only for purposes of illustration, the cam follower 318 has made initial contact with the cam 308. In FIG. 3D, the cam 308 has further rotated since that depicted in FIG. 3C and, thus, the cross section of the cam 308 has changed. At this point, and only for purposes of illustration, the cam follower 318 is in a different relative contact position with the cam 308.

Figure 4A:
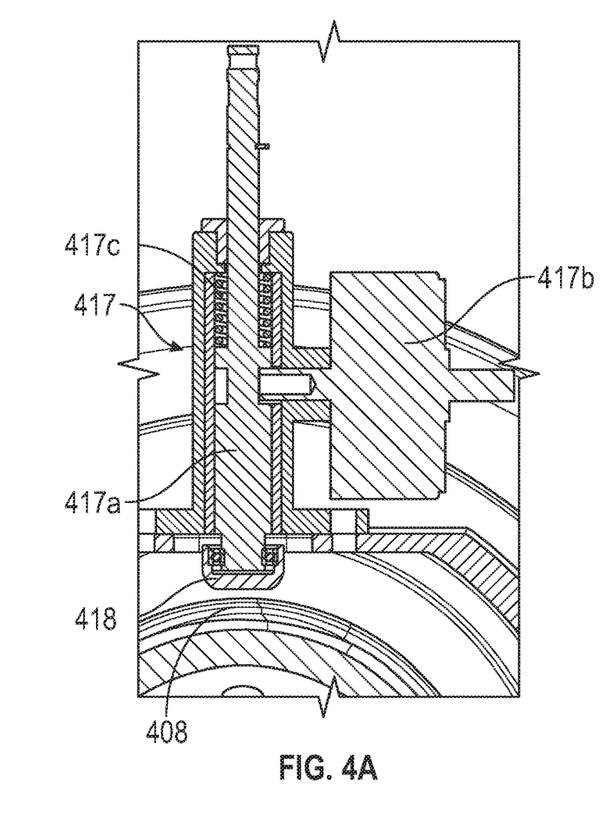
FIGS. 4A-4C are cross sectional views of movement of an actuator subassembly in a disconnect assembly according to an embodiment of the present invention.
Figure 4B:
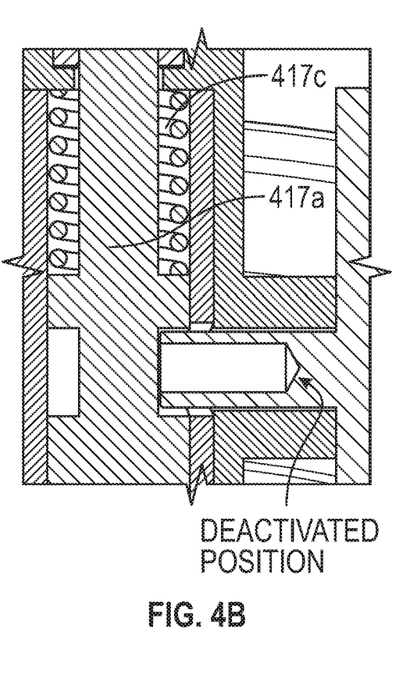
Figure 4C:
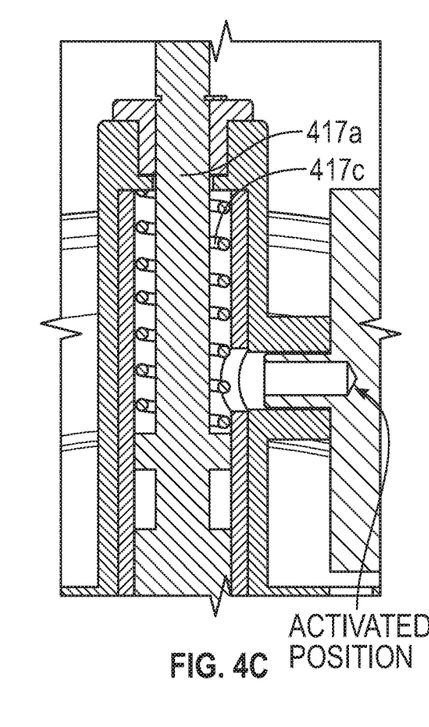

FIGS. 4A-4C depict an exemplary actuator subassembly 417 and may be similar to that described in relation to FIG.

1. Accordingly, reference numbers in FIGS. 4A-4C correspond to like reference numbers in FIG. 1.

In FIG. 4A, the actuator subassembly 417 may include a plunger 417a that can be moved radially by a spring 417c. A solenoid 417b may control when the spring 417 moves the plunger 417a and, in turn, moves a cam follower 418 radially towards a cam 408.

In FIG. 4B, the actuator subassembly 417 is in a deactivated position whereby the solenoid holds the spring 417c in a loaded condition.

In FIG. 4C, the actuator subassembly 417 is in an activated position whereby the solenoid has released the plunger 417a so that the spring 417c may actuate the plunger 417a.

FIGS. 5A-5F depict a disconnect system 500 in various phases of a connect position and a disconnect position. The disconnect system 500 may be similar to that described in relation to FIG. 1. Accordingly, reference numbers in FIGS. 5A-5F correspond to like reference numbers in FIG. 1.

Generally, a sleeve 509, a cam 508, a cam follower 518, and an interfacing element 519 are configured to move between respective connect positions and respective disconnect positions. Moreover, and in general, when the sleeve 509 moves, the cam 508 and the interfacing element 519 move between their respective connect positions and their respective disconnect positions. Also, and in general, when the cam follower 518 moves, the sleeve 509, the cam 508, and the interfacing element 519 move between their respective connect positions and their respective disconnect positions.

Figure 5A:
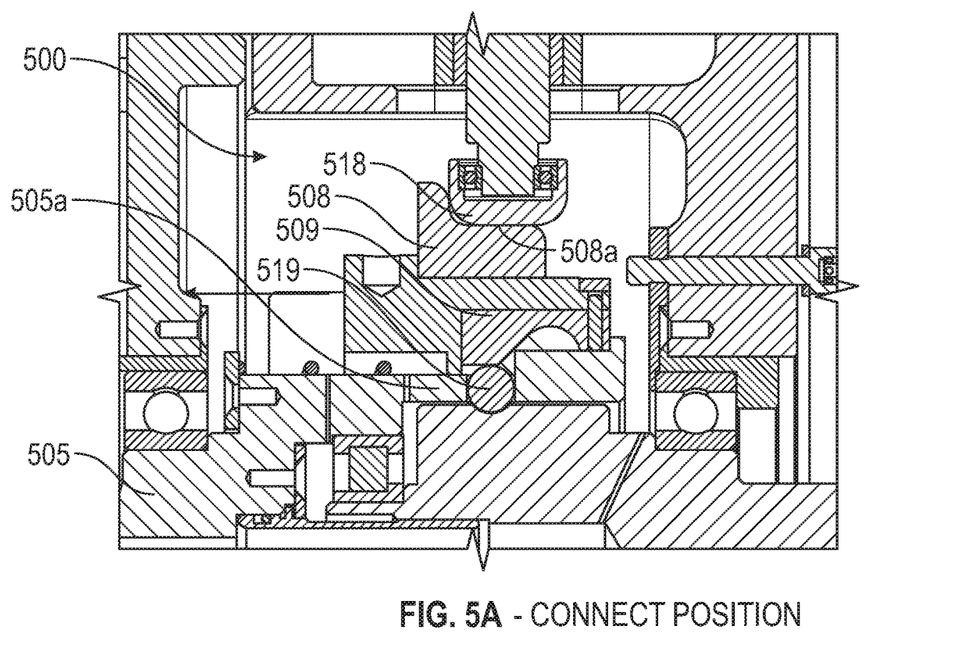
FIGS. 5A-5F are cross sectional views of movement from a connect position to a disconnect position of a disconnect assembly according to an embodiment of the present invention.

FIG. 5A shows the disconnect system 500 in an exemplary connect position. Accordingly, each of the components of the system 500 may be described as being in a respective connect position. For purposes of illustration, the cam follower 518 is in contact with the cam 508, such as at a cam surface 508a. The sleeve 509 is in an axial position along a longitudinal axis (not shown). Thus, the cam is in an axial position along the longitudinal axis. The interfacing element(s) or ball(s) 519 interfaces the sleeve 509. The ball 519 is in an exterior wall 505a of the output shaft and, at the same time, in an exterior surface 515a of the input shaft. Thus, the input shaft is connected to the output shaft.

Figure 5B:
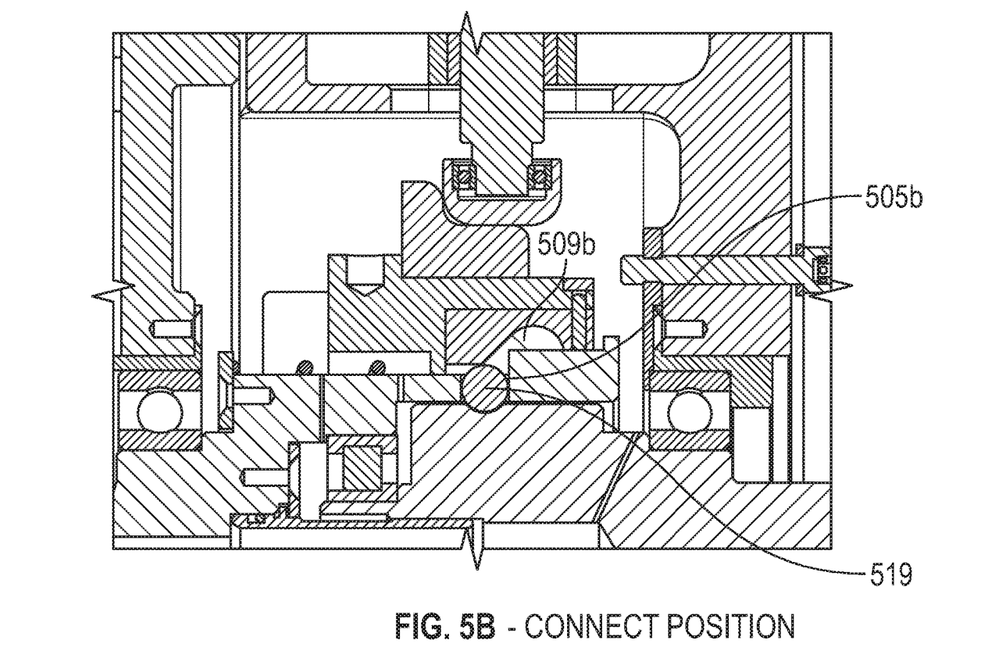

FIG. 5B shows the disconnect system 500 in another exemplary connect position. In contrast to that shown in FIG. 5A, the cam follower 518 is in contact at a different position on the cam 508, but still on the cam surface 508a. However, the ball 519 still interfaces the sleeve 509. The ball 519 is still in the exterior wall 505a of the output shaft and, at the same time, in the exterior surface 515a of the input shaft. Thus, the input shaft is connected to the output shaft.

Figure 5C:
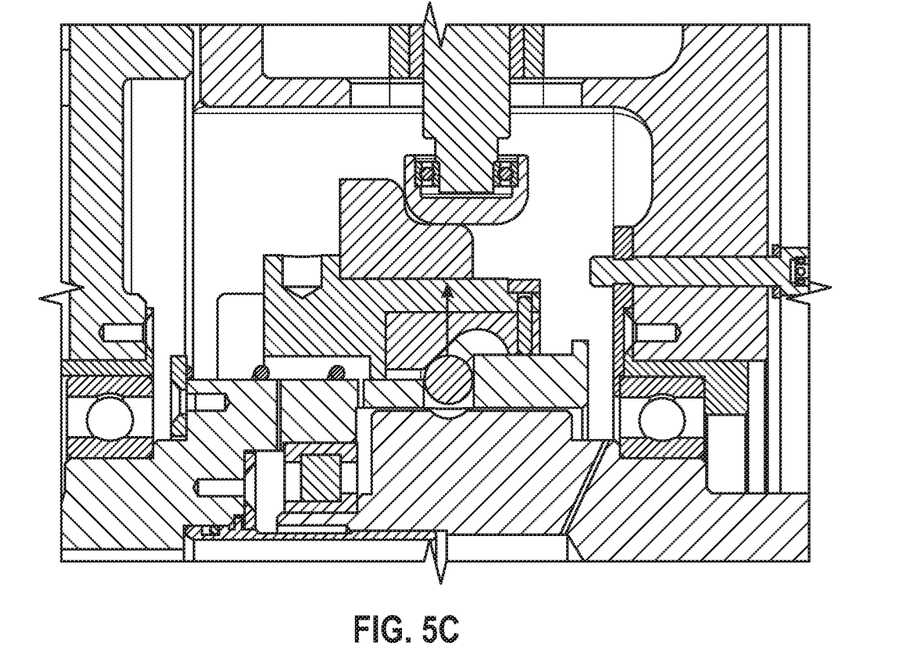

FIG. 5C shows the disconnect system 500 in an exemplary disconnect position. In contrast to that shown in FIGS. 5A-5B, the cam follower 518 is in contact at a different position on the cam 508, but still on the cam surface 508a. However, the sleeve 509 has moved axially to the "left". But the ball 519 has moved, due to centrifugal force, partially into the sleeve receiving element or channel 509b. The ball 519 is still in the exterior wall 505a (i.e., opening 505b) of the output shaft but has exited the exterior surface 515a (i.e., depression 515b) of the input shaft. Thus, the input shaft is disconnected to the output shaft.

Figure 5D:
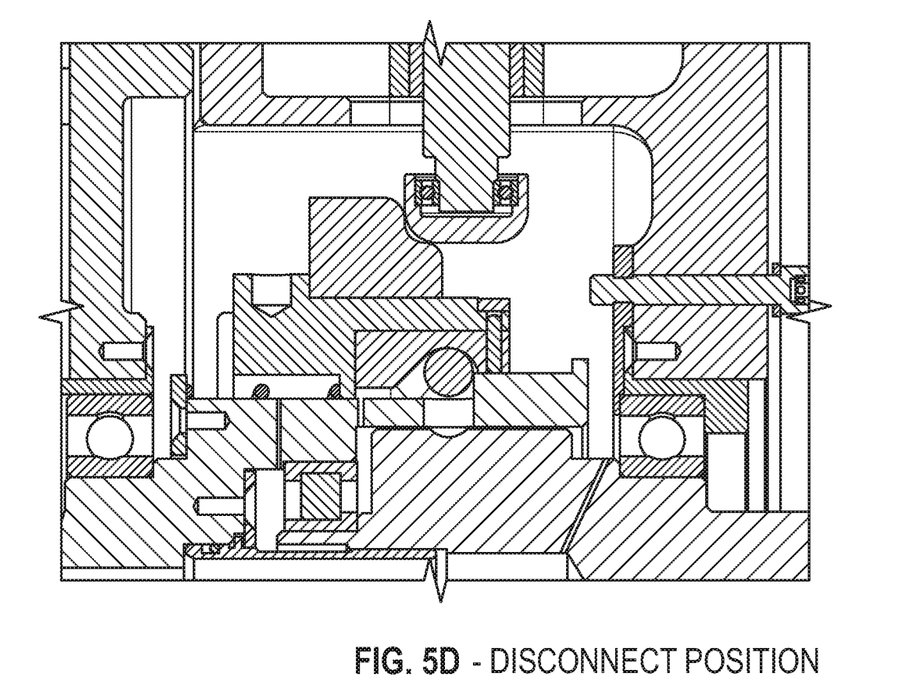

FIG. 5D shows the disconnect system 500 in another exemplary disconnect position. In contrast to that shown in FIGS. 5A-5C, the cam follower 518 is in contact at a different position on the cam 508 but still on the cam surface 508a. The sleeve 509 has moved further axially to the "left". The ball 519 has moved, due to centrifugal force, completely into the sleeve channel 509b. The ball 519 has moved completely out of the exterior wall 505a (i.e., opening 505b) of the output shaft and has exited the exterior surface 515a (i.e., depression 515b) of the input shaft. Thus, the input shaft is disconnected to the output shaft.

Figure 5E:
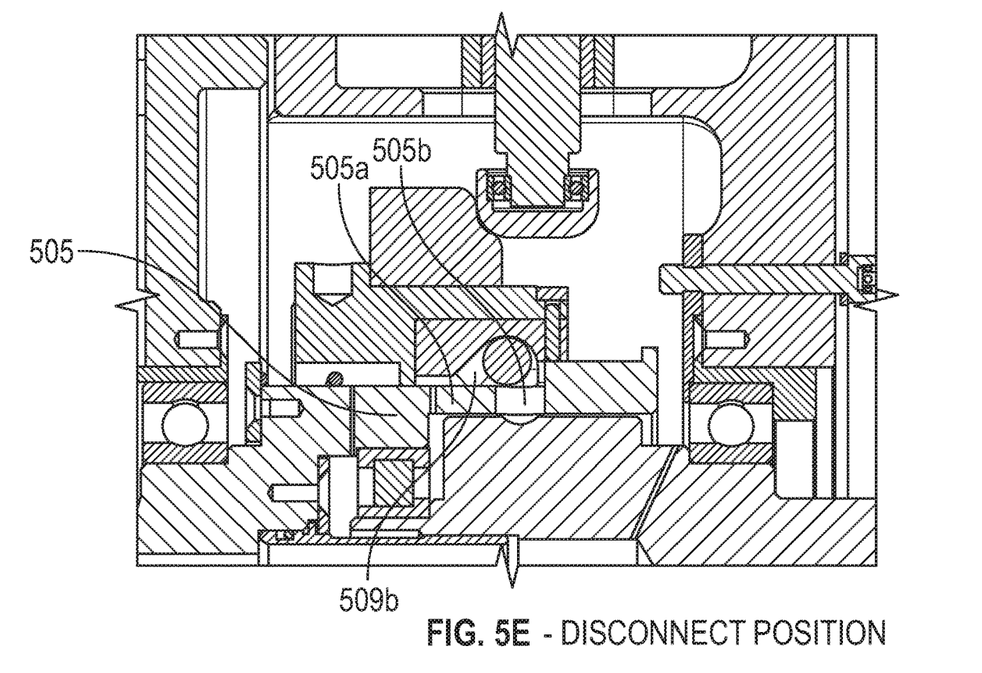

FIG. 5E shows the disconnect system 500 in yet another exemplary disconnect position. In contrast to that shown in FIG. 5D, the cam follower 518 is in contact at a near same position relative to the cam. The sleeve 509 has moved further axially to the "left". The ball 519 is completely in the sleeve channel 509b. The ball 519 is completely out of the exterior wall 505a of the output shaft and out of the exterior surface 515a of the input shaft. Thus, the input shaft is disconnected to the output shaft.

Figure 5F:
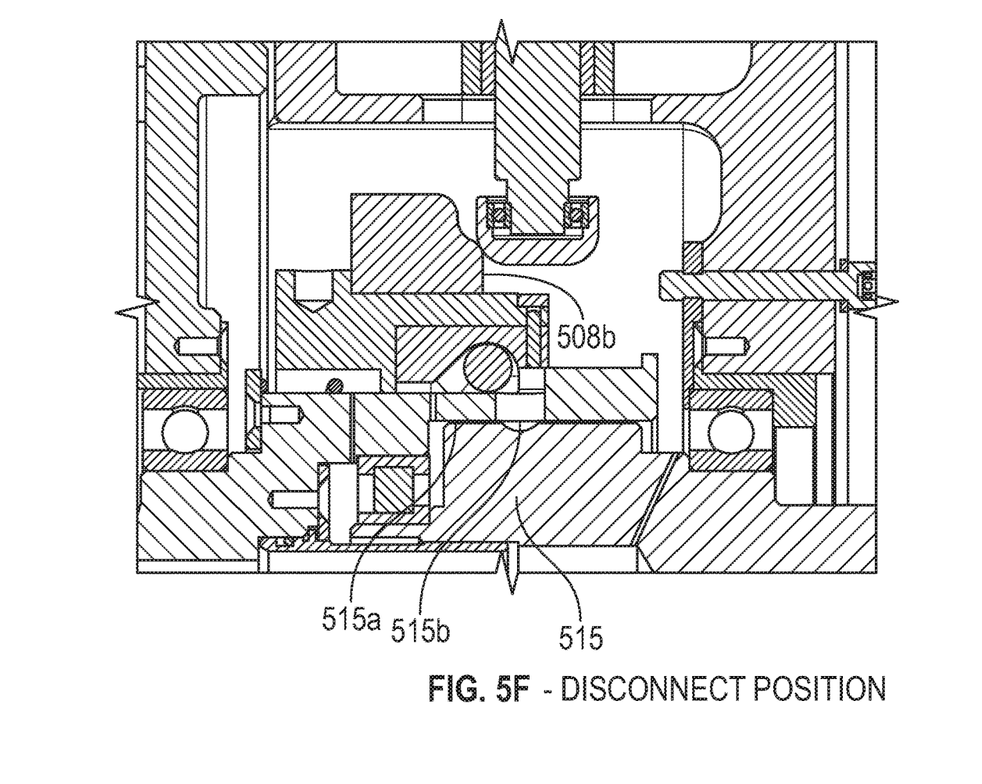

FIG. 5F shows the disconnect system 500 in a still further exemplary disconnect position. In contrast to that shown in FIG. 5E, the cam follower 518 is in contact at a different position on the cam 508—on a cam surface 508b. So positioned, the cam 508 is prevented from moving back and forth. The sleeve 509 has moved further axially to the "left". The ball 519 is completely in the sleeve channel 509b. The ball 519 is completely out of the exterior wall 505a of the output shaft and completely out of the exterior surface 515a of the input shaft. Thus, the input shaft is disconnected to the output shaft.

The sleeve 509 has moved further axially to the "left". The ball 519 is completely in the sleeve channel 509b. The ball 519 is completely out of the exterior wall 505a of the output shaft and completely out of the exterior surface 515a of the input shaft. Thus, the input shaft is disconnected to the output shaft.

Figure 6:
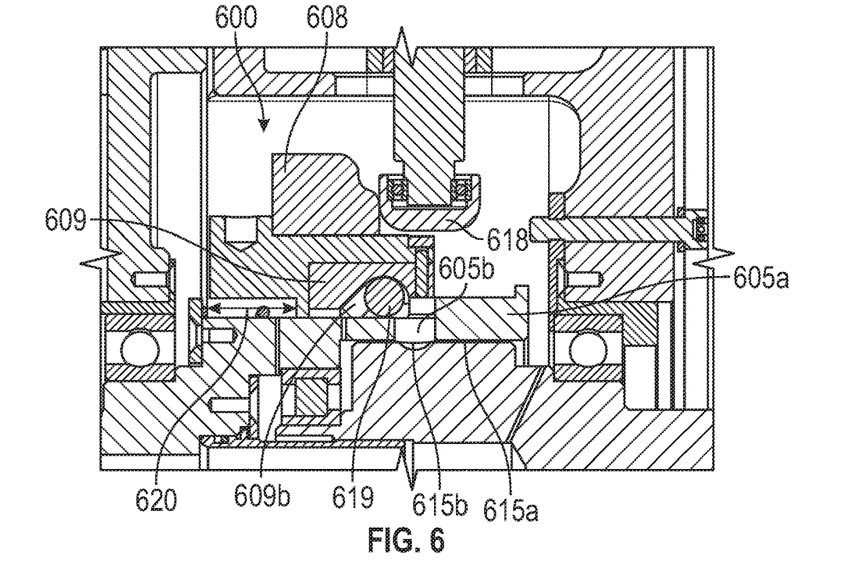
FIG. 6 is a cross sectional view of a disconnect assembly according to an embodiment of the present invention.

FIG. 6 depicts an exemplary disconnect assembly 600 and may be similar to that described in relation to FIG. 1. Accordingly, reference numbers in FIG. 6 correspond to like reference numbers in FIG. 1.

FIG. 6 shows the disconnect assembly 600 in an exemplary disconnect position. A cam follower 618 has reached its full range of axial travel to the "left" and may, in embodiments, be in contact with a cam 608 and a sleeve 609. A ball 619 is completely in a sleeve channel 609b. The ball 519 is completely out of an exterior wall 605a (i.e., opening 605b) of the output shaft and completely out of an exterior surface 615a (i.e., depression 615b) of the input shaft. A spring 620 is now loaded to reset the assembly 600 (more specifically, the sleeve 609) to a connect position.

Figure 7A:
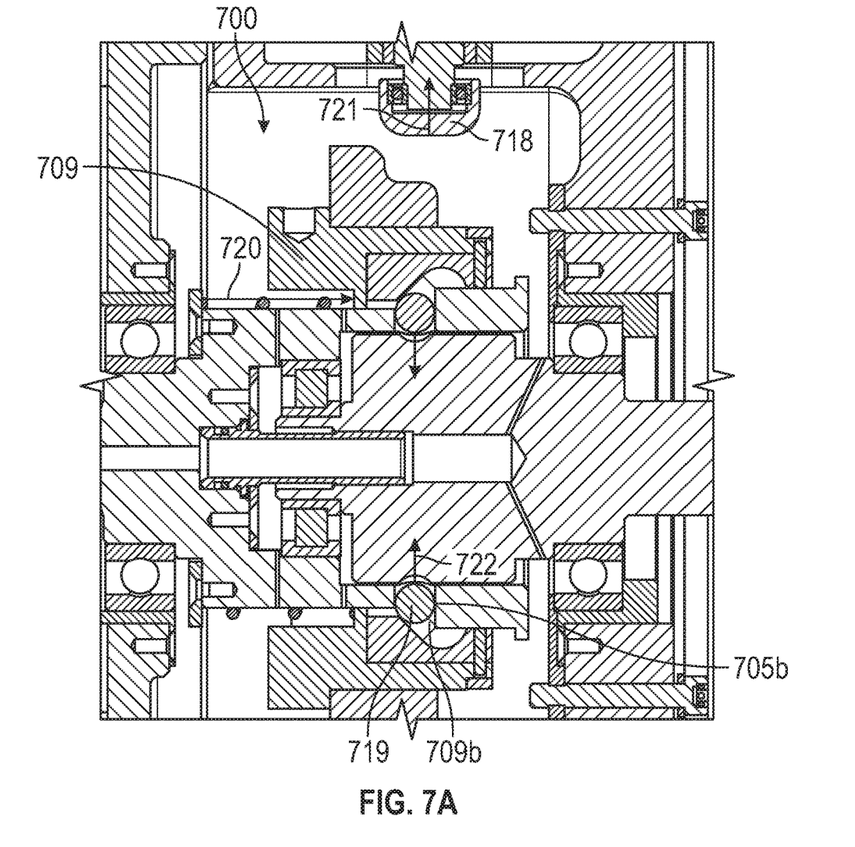
FIGS. 7A-7B are cross sectional views of a method of reset of a disconnect assembly according to an embodiment of the present invention.
Figure 7B:
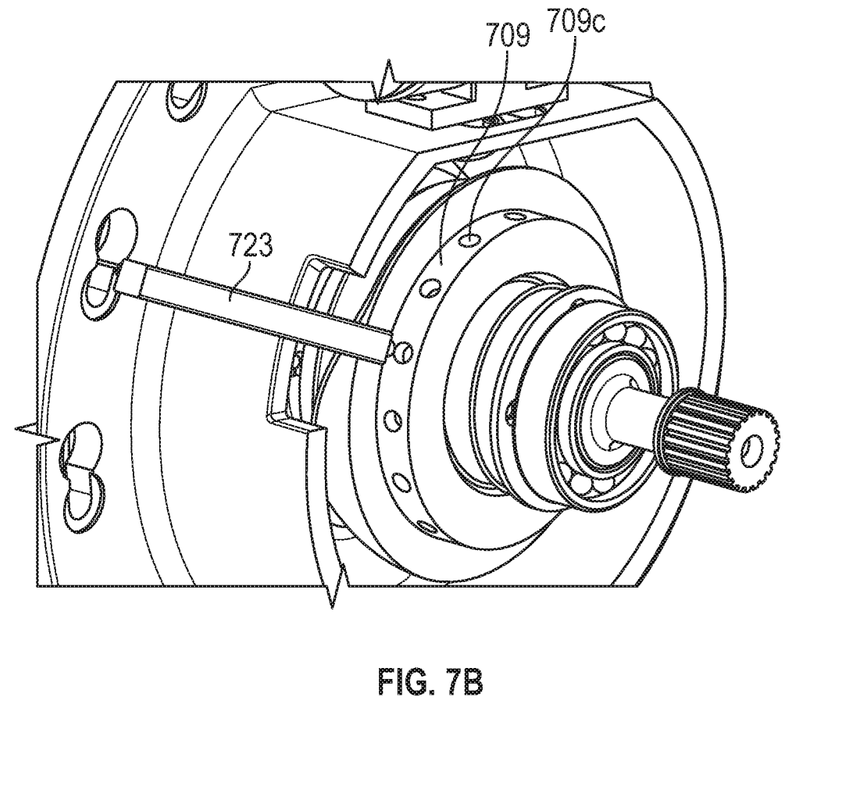

FIGS. 7A-7B depict an exemplary disconnect assembly 700, in a connect position, and may be similar to that described in relation to FIG. 1. Accordingly, reference numbers in FIGS. 7A-7B correspond to like reference numbers in FIG. 1.

In FIG. 7A, a cam follower 718 has been moved radially away in a direction 721 from a longitudinal axis (not shown). That enables a spring 720 to move a sleeve 709 axially to the "right" along the longitudinal axis (not shown). Thereby, a ball 719 may move (due to the absence of centrifugal force) out of a sloping channel 709b in the sleeve 709. Once out of the channel 709b, the ball 719 may move radially inward in a direction 722 and into an opening 705b of the output shaft.

In FIG. 7B, the above movement of the ball 719 may be accomplished using a tool 723 that can be inserted into an aperture(s) 709c of the sleeve 709. The tool 723 can be used to adjust at least a circumferential position about a longitudinal axis (not show) of the sleeve 709 (and thereby the output shaft) relative to at least the input shaft.

It should be understood, of course, that the foregoing relates to exemplary embodiments of the invention and that modifications may be made without departing from the spirit and scope of the invention as set forth in the following claims.

We claim:

1. A disconnect assembly for an input shaft and an output shaft, comprising:
    a sleeve configured to be disposed about a longitudinal axis of the input shaft and the output shaft;
    an insert, axially seated in a void in the sleeve, the insert formed of a material harder than the sleeve and including one or more sloped channels formed at an angle relative to the longitudinal axis;
    a cam disposed about the sleeve;
    a cam follower configured to contact the cam; and
    an interfacing element including one or more balls configured to operatively move within the one or more sloped channels of the insert, and to interface the input shaft, and the output shaft;
    wherein the sleeve, the cam, the cam follower, and the interfacing element are configured to move between a respective connect position and a respective disconnect position.

2. The assembly of claim 1, wherein the sleeve is affixed to the input shaft.

3. The assembly of claim 1, wherein the sleeve is further configured to rotate about the longitudinal axis.

4. The assembly of claim 1, wherein the cam is affixed to the sleeve.

5. The assembly of claim 1, wherein the cam is further configured to rotate about the longitudinal axis.

6. The assembly of claim 1, wherein the cam follower is further configured to move into and out of contact with the cam.

7. The assembly of claim 1, wherein the cam follower is further configured to move radially away from and towards the longitudinal axis.

8. A disconnect assembly for an input shaft and an output shaft, comprising:
    a sleeve configured to operatively interface the input shaft and the output shaft;
    an insert, axially seated in a void in the sleeve, the insert formed of a material harder than the sleeve and including one or more sloped channels formed at an angle relative to a longitudinal axis of the input shaft and the output shaft;
    a cam configured to rotate and translate in relation to movement of the sleeve; and
    an interfacing element including one or more balls configured to operatively move within the one or more sloped channels of the insert, and to interface the input shaft, and the output shaft;
    wherein, when the sleeve moves, the cam and the interfacing element move between a respective connect position and a respective disconnect position.

9. The assembly of claim 8, wherein the one or more balls each are configured to move in a respective channel of the insert between a connect position and a disconnect position.

10. The assembly of claim 8, wherein the sleeve is further configured to translate along the longitudinal axis.

11. The assembly of claim 8, wherein the cam is further configured to translate along the longitudinal axis.

12. The assembly of claim 8, wherein the cam includes an undulating exterior surface.

13. The assembly of claim 8, further including a cam follower that operatively interfaces the cam.

14. The assembly of claim 8, wherein the output shaft includes an exterior wall with an opening therein to receive the interfacing element.

15. The assembly of claim 8, wherein the input shaft includes an exterior surface with a depression therein to receive the interfacing element.

16. A disconnect assembly for an input shaft disposed in an output shaft, comprising:
    a sleeve configured to move in an axial direction along a longitudinal axis;
    an insert, axially seated in a void in the sleeve, the insert formed of a material harder than the sleeve and including one or more sloped channels formed at an angle relative to the longitudinal axis;
    an undulating surface element on the sleeve and configured to rotate about and move axially along the longitudinal axis;
    a surface follower that interfaces the undulating surface element and is configured to move radially away from and towards the longitudinal axis;
    one or more balls that interfaces the insert, the input shaft, and the output shaft, and the one or more balls configured to move radially away from and towards the longitudinal axis in an associated one of the one or more sloped channels of the insert; and
    wherein, when the surface follower moves, the sleeve, and the undulating surface element are configured to enable movement of the one or more balls in the associated one or more sloped channels between a respective connect position and a respective disconnect position.

17. The assembly of claim 16, wherein the undulating surface element is a cam.

18. The assembly of claim 16, wherein the surface follower is a cam follower.

19. The assembly of claim 16, wherein the one or more balls comprises a plurality of balls.

20. The assembly of claim 16, wherein the longitudinal axis extends through the input shaft and the output shaft.

* * * * *